Jan. 27, 1970

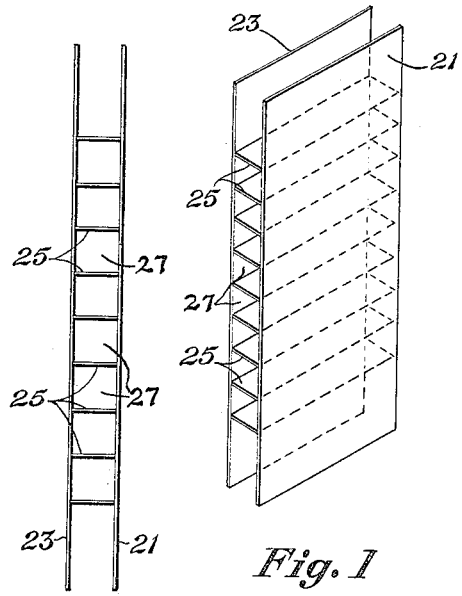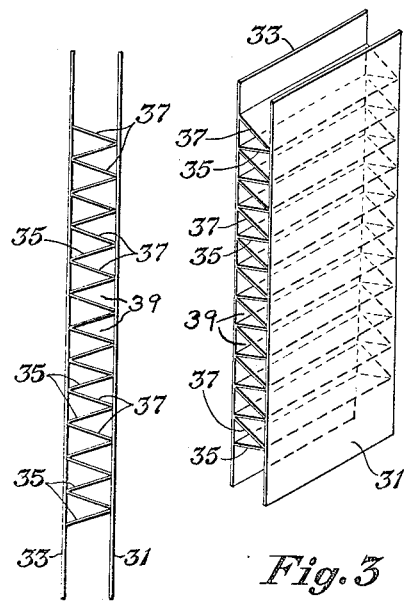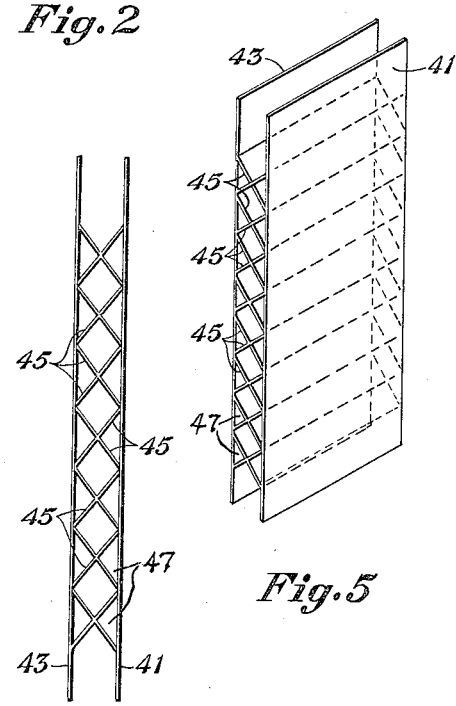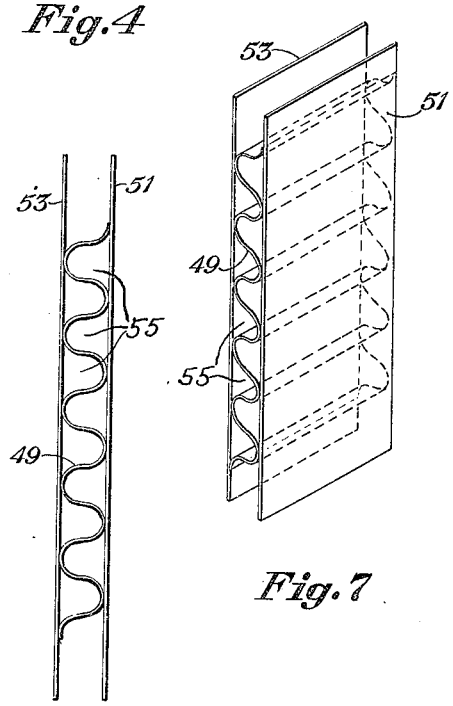

T. N. HOOPER ET AL
ELECTRODES HAVING ELECTROCHEMICALLY
ACTIVE SECONDARY ELECTRODES 3,492,161

Filed Jan. 9, 1964

INVENTORS,
James K. Truitt
BY Thomas N. Hooper
William D. Harris, Jr.
Attorney

' # United States Patent Office 3,492,161
Patented Jan. 27, 1970

3,492,161
ELECTRODES HAVING ELECTROCHEMICALLY
ACTIVE SECONDARY ELECTRODES
Thomas N. Hooper, Richardson, and James K. Truitt,
Dallas, Tex., assignors to Texas Instruments Incorporated, Dallas, Tex., a corporation of Delaware
Filed Jan. 9, 1964, Ser. No. 336,721
Int. Cl. H01m 27/00, 13/00
U.S. Cl. 136—86
10 Claims

ABSTRACT OF THE DISCLOSURE

Disclosed is a porous secondary electrode for use in a fuel cell, said secondary electrode having an electrochemically active surface connected to a primary porous electrode such that the secondary electrode has an effective mass transfer relationship with the primary electrode.

---

This invention relates to electrodes, and more specifically, to electrodes having electrochemically active secondary electrodes.

Considerable research and development has taken place in the fuel cell art in the last several years. While numerous developments have been made, a problem area has been in providing a system with a sufficiently high power density to be practical. By power density is meant the power output per unit volume. Unless power density is relatively high, extremely large units are required to obtain a substantial quantity of power. Even in the case of a single cell, or a pair of cells, the space problem is presented by low power densities can cause trouble. Particularly, however, in relatively large units comprising several cells or a large numer of cells, the power density factor often becomes critical.

Power densities of the prior art are, in general, comparatively low. Three-phase contact of reactant (fuel and oxygen, usually both gases), electrolyte and electrode determines the electrical output of a given system. Systems generally consist of porous electrode structure saturated to some degree with electrolyte and a larger void space for the passage of reactant, normally gas. In order to conserves space, some systems have been connected in series and/or parallel so that void spaces become common to two or more electrodes of the same polarity but the size of the void space is, in general, out of proportion with the amount of space allocated the other two phases, i.e., the electrode and electrolyte. It is thus seen that a problem of the prior art is the poor power performance for a given volume, the power density of various fuel cell systems of the prior art being relatively low.

An additional problem of the prior art is the flooding of electrodes by electrolyte. This occurs when a substantially complete saturation of electrode pores by electrolyte has resulted. Electrode porosity is difficult to control and sometimes marginal designs or other factors will lead to electrolyte flooding. In turn, this leads ultimately to electrode polarization. Electrolyte film thickness on the electrode surface is a function of surface area divided by the electrolyte quantity. In optimizing film thickness, any changes in electrolyte quantity have a smaller effect on the ratio if the surface area is made as large as possible. Present electrode fabrication techniques limit the range through which electrolyte quantity may be varied to control the film thickness. It is apparent that a substantial increase in surface area for any given electrode would help solve the problem; however, the effective addition of surface area in a way not to militate severely against power density, or to cause other unfavorable effects, has presented a problem.

A further problem in the prior art has been in providing structural support to adjacent electrodes in a manner which will not add wasted space, wasted weight, and considerable cost for realizing what would deceptively seem to be a comparatively simple end.

Accordingly, it is an object of this invention to overcome the stated problems and difficulties of the prior art.

More specifically, it is an object of the instant invention to provide means to increase the power density of a fuel cell; and of greater importance, to provide means to substantially increase the power density of a fuel cell battery system having from two to a large number of cells.

Moreover, it is a further object of the instant invention to provide means for a fuel cell, and more important, means for a fuel cell battery system including from two to a large number of cells, for eliminating or minimizing problems of flooding.

It is a further object of the instant invention to provide means to reinforce electrodes in a fuel cell system, and at the same time, obtain the advantage of such reinforcing means as a by-product of other important advantages which will more than make up for the volume, weight, or cost of providing such means.

It is a further object to provide a simple structure with a triple function enabling it to realize all of the stated objectives in the foregoing three paragraphs, and that will do so efficiently and economically.

In accordance with this invention, a secondary electrode is provided in combination with a primary electrode. The combination is intended for use in a cell in which an electrochemical reaction occurs that involves an electrolyte on the surface area of a porous electrode. The porous secondary electrode adjoins the primary electrode in effective electrolyte mass transfer relationship so that electrolyte can be transferred from the primary electrode to the secondary electrode. The secondary electrode extends outwardly from the body of the primary electrode and substantially increases the effective surface area for electrochemical reaction.

In a more specific aspect, the secondary electrode adjoining the primary electrode has structure providing channel means communicating with a substantial surface area on the primary electrode and the channel means each provides sufficient area so that normal flow rates of fluids past the primary electrode surface in the direction of the channels are not substantially decreased as a result of the secondary electrode.

In a preferred embodiment, the instant invention provides a secondary electrode in combination with a pair of plate-like electrodes of like polarity and potential. This combination is for use in a fuel cell which has oppositely disposed cells in general mirror-image relationship with the pair of electrodes of like polarity and potential disposed with the outer faces of each electrode in contact with electrolyte and the inner faces in contact with a fluid reactant flowing there-between. In such a fuel cell, an interface of electrochemical reaction is provided between the electrolyte and the reactant on surface areas of the porous electrodes. The secondary electrode is of a porous material and either side of it is joined to the respective opposite face of each primary electrode in such manner that effective electrolyte mass transfer occurs from the primary electrodes to the secondary electrode. The secondary electrode is configured as a lattice-like structure interconnecting the primary electrodes to provide structural support and at the same time provide a plurality of channels communicating with unobstructed surface area of the primary electrodes. The secondary electrode has a comparatively small effect on reactant flow rates between the primary electrodes and the secondary electrode and provides a substantial increase in effective electrochemical reactive surface area over that provided by the primary electrodes without the secondary electrode.

In a quite specific preferred embodiment, this invention provides a porous, corrugated secondary electrode joined to and interconnecting a pair of opposite fuel cell primary electrodes of like polarity.

In a further quite specific embodiment, the instant invention comprises a thin, porous secondary electrode of fine mesh screen wire interconnecting a pair of spaced apart primary electrodes of like polarity and potential that are provided with a common reactant flow therebetween.

For a more complete understanding of the present invention and for further objects and advantages thereof, reference may now be had to the following description taken in conjunction with the accompanying drawings in which:

FIGURE 1 is a perspective view of an embodiment of the present invention;

FIGURE 2 is a side view of the embodiment of FIGURE 1;

FIGURE 3 is a perspective view of an alternate embodiment of the present invention;

FIGURE 4 is a side view of the embodiment of FIGURE 3;

FIGURE 5 is a perspective view of another alternate embodiment of the present invention;

FIGURE 6 is a side view of the embodiment of FIGURE 5;

FIGURE 7 is a perspective view of a preferred embodiment of the present invention;

FIGURE 8 is a side view of the preferred embodiment of FIGURE 7;

Figure 9:
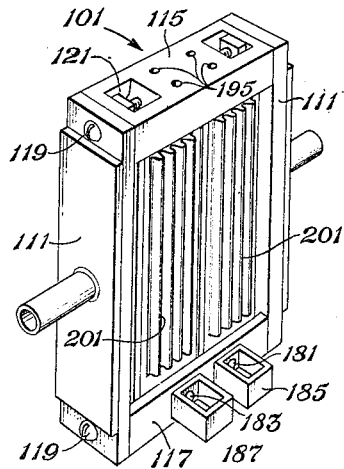
FIGURE 9 is a perspective view of a fuel cell unit embodying structure of the present invention used in a specifically preferred form.

Referring now to FIGURES 1 and 2 therein is illustrated a pair of generally rectangular porous plate-like electrodes 21 and 23. These electrodes are interconnected by a plurality of regularly, vertically spaced-apart rectangular horizontal plates 25.

The specific electrodes 21 and 23 are made out of sintered silver and fabricated by sintering small particles of silver together into the desired final shape, a technique well known in the art. As a multiplicity of different electronically conducting materials is usable, it is not intended that the material of construction of the electrodes serve as any limitation since the invention is adaptable to any effective electrode material. Examples for some applications are silver nickel, iron, stainless steel, silver-coated stainless steel, nickel impregnated stainless steel, etc.

The horizontal plates 25 are preferably made of the same, or a very similar, material to the electrodes. This prevents unwanted electrochemical activity resulting from the junction of two dissimilar metals. Plates 25 are porous.

The plates 25 are joined to the electrodes 21 and 23 by conventional methods, such as spot welding.

It will be noted that the structure resulting from the joinder of electrodes 21 and 23 by horizontal plates 25, as illustrated in FIGURE 1 and FIGURE 2, defines a a volume of void space intermediate the parallel electrode plates 21 and 23 while at the same time providing a substantial amount of surface area contiguous to such intermediate void space. With plates 21 and 23 serving as electrodes of like polarity and at like potential in two oppositely disposed separate cells, as in a fuel cell battery made up of at least two oppositely disposed cells, the flow of reactant, fuel or oxidizer, as the case may be, can be directed between the electrodes 21 and 23 to contact a film of electrolyte from the respective cells on surface areas of the porous electrodes 21 and 23. Moreover, electrolyte will transfer across the contact areas of porous plate 25 and electrodes 21 and 23 to form a film of electrolyte on the surface areas of the porous plates 25. In such application, it will be seen that the plates 25 substantially increase the electrode surface area available. Since they will be in excellent contact with fuel or oxidizer reactant moving between electrodes 21 and 23, they function quite efficiently as secondary electrodes and augment the effect of the "primary" electrodes 21 and 23 to a considerable extent. Thus, for a given volume, the cells will produce a higher output.

The plates 25 are preferably joined to the electrodes 21 and 23 in such a manner that relatively unobstructed communication is permitted between the pore structure of each in the vicinity of the joint. This insures that good mass transfer of electrolyte will occur from the electrodes 21 and 23 to the secondary electrode 25.

The secondary electrodes defined by the plates 25 not only serve an electrochemically active function, to serve as secondary electrodes augmenting the primary electrodes, but in addition serve as reactant fluid flow directors and distributors between the primary electrodes. The spacing is so provided that it is compatible with evenly directing the flow of reactant fluid (liquid or gas, as the case may be) by means of the several channels 27 defined between the electrodes 21 and 23 by the opposite faces of each adjacent pair of plates 25. With such a configuration, the plates 25 actually assist in properly distributing the reactant material over the surface areas of the primary and secondary electrodes, i.e., electrodes 21 and 23, and plates 25, respectively.

It will further be noted that the plates 25 provide structural support for opposed plates 21 and 23 of like polarity in "mirror-image" arranged cells.

In fuel cell batteries based on this "mirror-image" arrangement, using secondary electrodes, it is found that a higher output per unit volume can be obtained by a considerable extent than is experienced without the use of such electrodes. Thus, a relatively high power density is made possible.

If desired, the plates 21 and 23 may be fine mesh wire screens. If it is necessary to add rigidity, this can be accomplished by framing the screens, like a picture, with thin sheets of supporting material. Moreover, plates 25 may also take the form of screens. If they are framed, however, it is preferable to provide a plurality of intermittent openings in the framework adjacent contact with the electrodes 21 and 23 to more effectively provide for mass transfer of electrolyte from the electrodes 21 and 23 to the plates 25.

FIGURES 3 and 4 illustrate rectangular plate-like electrodes 31 and 33, of the same basic nature as electrodes 21 and 23, discussed above. They have a plurality of intermediate members 35 and 37 between them. These members 35 and 37 are analogous to the plates 25 of FIGURES 1 and 2. Members 35 and 37 are rectangular plates of like configuration to each other, having substantially the same length as the width of electrodes 31 and 33. Members 35 and 37 are oppositely inclined at the same angle. These members are interconnected alternately in the space between electrodes 31 and 33 substantially throughout the height of these electrodes. The ends of members 35 and 37 meet adjacent their respective end intersections with electrodes 31 and 33. As viewed from the side, the interconnected members give the appearance of a vertical zig-zag arrangement, i.e., they appear as a line of adjacent contiguous "W's" which have been rotated from the horizontal to the vertical. Note the channels 39 defined between each adjoining member 35 and 37.

Another configuration of secondary electrodes between a pair of primary electrodes 41 and 43 is illustrated in FIGURES 5 and 6. Therein, the regular cross section of each secondary electrode 45 is shaped as an X. The "X's" lie one below the other with the top-most extremity of one X adjoining the bottom-most extremity of the one above. It will be seen, by reference to FIGURE 6, that a lattice-work of secondary electrodes is defined by the assembled structure. Note that a plurality of channels 47 in this lattice-work communicate with an adjacent electrode.

In FIGURES 7 and 8, a corrugated secondary electrode 49 is shown separating, but interconnecting, the electrodes 51 and 53. In cross section, the corrugated secondary electrode has the general appearance of a sine wave. This configuration has been found to be particularly suitable for fine mesh screen secondary electrodes. The corrugations add rigidity to the screen and, moreover, such corrugated secondary screen electrodes are rather simply joined to the primary electrodes by spot welding intermittently along the intersections of the corrugations with the primary electrodes. Note the reactant flow channels 55 defined between the electrodes by the assembled structure.

Figure 10:
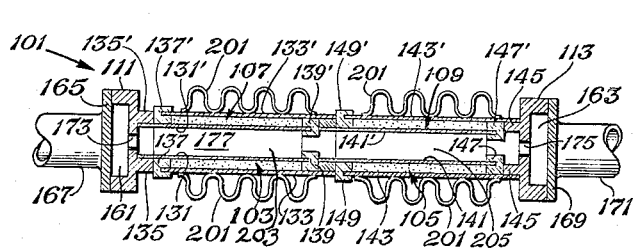
FIGURE 10 is a sectional view taken along 10—10 of FIGURE 9.
Figure 11:
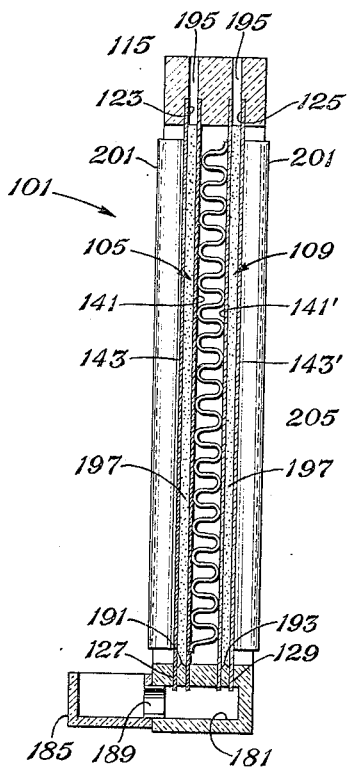
FIGURE 11 is a cross-sectional view taken along 11—11 of FIGURE 9.

Referring to the structure of FIGURES 9–11, therein is indicated generally at 101 a fuel cell battery unit incorporating structure in accordance with the present invention. In the copending application of James K. Truitt, application Ser. No. 336,515, filed Jan. 8, 1964, entitled Fuel Cell Batteries, the structure of units of the nature of 101 is thoroughly described and claimed, with the exception of the secondary electrode feature, the latter of which is a part of the present invention. Reference to the basic structure of the said co-pending application is repeated herein only to the extent necessary to explain the function of secondary electrodes of the present invention, in combination with such structure, as is illustrated by unit 101.

Unit 101 is a four-cell fuel cell battery unit. It has two sets of series cells, 103 and 105, and 107 and 109, respectively, in parallel (see FIGURES 10 and 11). Support for the unit is provided by generally rectangular conducting metallic enclosures 111 and 113 at each end of the unit. Upper insulating cell support 115 and lower insulating cell support 117 define a top and bottom, respectively, for the unit. These insulated cell supports are made of a non-conducting material such as alumina or lava. The conducting fuel feed enclosure 111 and conducting spent fuel exhaust enclosure 113, and the upper and lower insulating cell supports 115 and 117 are held in their respective positions by bolts such as 119. Suitable bolt receiving recesses such as 121 are provided in the outer surfaces of the insulating supports to make provision for engaging a nut on the end of each bolt.

The opposing surfaces of the upper and lower insulating supports 115 and 117, respectively, are recessed to define elongated channels 123 and 125 and 127 and 129, respectively (as shown in FIGURE 11). Channels 123 and 127 are in vertical alignment, as are channels 125 and 129. Fuel cells 103 and 105 are carried by channels 123 and 127, with their upper and lower edges, respectively, riding within and supported by these channels (only fuel cell 105 being shown in FIGURE 11). Similarly, cells 107 and 109 are carried with their upper edges supported within channel 125 and their lower edges within opposite channel 129 (only fuel cell 109 being shown in FIGURE 11).

Cell 103 consists of a porous rectangular plate-like fuel electrode 131 and an oppositely disposed porous air electrode 133 of like configuration. The end of electrode 131 adjacent to the fuel enclosure 111 extends beyond the corresponding end of air electrode 133. The extending end portion of electrode 131 is welded onto vertical, rectangular bus part 135, which extends from the rear face of enclosure 111. Electrode 133 is spaced from electrode 131 and also from vertical bus part 135, by a vertical insulating grooved spacer 137. This spacer runs the height of electrodes 131 and 133. Its grooved portion receives the edge of electrode 133 and gives it lateral support. Preferably, a clearance is provided between the received end of the edge of electrode 133 and the rear face of the groove in insulating grooved spacer 137 to provide room for substantial expansion.

Since the electrode 133 is the same size as electrode 131, it extends the same distance beyond the edge of electrode 131 on the end furthest from the fuel enclosure 111 that electrode 131 extends beyond electrode 133 on the other end. The end of electrode 131 is engaged within the slot of insulating grooved spacer 139. This spacer, shaped exactly as spacer 137, previously discussed but oppositely faced, also spaces electrode 133 from electrode 131.

A vertical conducting bar of rectangular cross section 132 has its opposite faces engaged with the extending end portion of electrode 133 and the extending end portion of electrode 141, the latter being the fuel electrode of fuel cell 105. The bar is preferably welded in position to the overlaping, opposite end portions of electrodes 133 and 141. Air electrode 143 lies generally opposite fuel electrode 141 of cell 105. It has the same configuration, but is offset to extend toward the enclosure 113 beyond the corresponding end of electrode 141. This extending end is welded to bus part 145, which has the same general configuration as bus part 135, previously discussed. This bus part extends from the inner face of enclosure 113.

Insulated grooved spacers 147 and 149, respectively, receive the opposite free ends of electrodes 141 and 143. Moreover, they space the electrodes apart in similar fashion to that previously discussed for insulating grooved spacers 137 and 139, with relation to electrodes 133 and 131.

Cells 107 and 109 are constructed in similar fashion to that just discussed for cells 103 and 105. Note that the only difference in configuration is that cells 107 and 109 are the mirror-image of cells 103 and 105. Accordingly, corresponding parts are indicated by the same numbers but with the character prime added.

The opposite sides of the cells 107 and 109 are welded to bus parts 135' and 145' which extend from the opposite faces of the enclosures 111 and 113 and are comparable to their respective counterparts which are welded to the other line of cells.

The enclosures 111 and 113 are shaped to provide hollow cavities 161 and 163, respectively, in their interior portions. The end plate 165 of plenum 111 is a rectangular plate member welded into position to cover the cavity 161. A fuel inlet tube 167 communicates with the interior of this cavity through an aperture in the central portion of end plate 165. Enclosure 113 has a similar end plate 169 covering its inner cavity and an exhaust tube 171 communicates with the cavity 163 through an opening in the central portion of end plate 169. An elongated slot 173 is provided through the wall in enclosure 111 that lies next to the fuel cells and an oppositely disposed slot of similar configuration, slot 175, is also formed in the wall of enclosure 113 closest to the fuel cells.

It will thus be seen that communication is permitted from fuel tube 167, via enclosure cavity 161, to the interior of the fuel cells down corridor 177, which lies between the opposing lines of fuel electrodes, thence into enclosure cavity 163 and out through exhaust tube 171.

The cells are provided with electrolyte through electrolyte bores 183 (not shown in the figures) and 181 (shown in FIGURE 11). These bores extend transverse to the length of lower insulating cell support 117. Each bore terminates just beyond the electrode most remote from the bore entrance. The diameter of each bore is so selected that each bore has a common intersection with the lower portion of the channels 127 and 129. Thus, openings are formed which provide communication between the area lying above these channels and the bores.

Electrolyte storage cups 185 and 187 adjoin and communicate with bores 181 and 183, respectively. Connection is made by holes 189 and 190.

Ridges are provided intermediate each top and bottom channel 123, 125, 127 and 129. For example, see ridges 191 and 193 in lower channels 127 and 129, respectively. These ridges space apart and support the electrode plates, such as 141 and 143, and 141' and 143', respectively. See FIGURE 11. Note also in FIGURES 9 and 11 that the section taken is through the right hand pair of vertical apertures 195, each of which communicates through upper insulating cell support 115 to provide atmospheric pressure within the fuel cells 105 and 109, the left hand pair of vertical apertures 195 providing atmospheric pressure within fuel cells 103 and 107. The fuel cells all contain small particles of magnesium oxide between their respective electrodes. This magnesium oxide provides capillary action to support the electrolyte, preferably a molten sodium-lithium carbonate eutectic within each cell, the magnesium oxide effectively serving as a matrix. The lower cups 185 and 187 are filled with electrolyte, thus filling the electrolyte bores, or cavities as they may preferably be called, 181 and 183 (not shown), with electrolyte. The extending end portions of the porous electrodes (for example, see the bottom edges of electrodes 141 and 143 and 141' and 143' in FIGURE 11) provide capillary action to draw electrolyte to the magnesium oxide, and thereafter, the capillary action of the magnesium oxide fills the various cells. The magnesium oxide-electrolyte combination is illustrated in FIGURES 10 and 11 by the numerals 196, 196', 197 and 197'. The electrolyte in the cups and bores is not illustrated, but it is substantially to the very top of each cup.

Each of the air electrodes of the unit 101 has a corrugated secondary electrode 201 attached to its outer face, as by spot welding. The corrugations are vertically oriented. The height of each secondary electrode 201 is comparable to the height of the respective primary electrodes to which it is attached, but is somewhat shorter to permit the upper and lower end of the primary electrodes to enter the opposing channels 123 and 125 on the one hand and 127 and 129 on the other. It will be noted that each corrugated electrode 201 provides a substantially increased surface area in addition to that amount provided by the exposed surface of the electrode to which it is attached. From the point of view of practical electrochemical activity, the corrugated electrode 201 of the specific embodiment illustrated provides about twice the surface area that is provided by the primary electrode.

The unit 101 has a pair of secondary fuel electrodes, 203 and 205 interconnecting its opposed fuel electrodes of like potential. Thus, the corrugated secondary electrode 203 interconnects fuel electrodes 131 and 131'. The corrugated secondary electrode 205 interconnects the fuel electrode 141 and 141'. In each case, the joinder between the opposed electrodes of like potential and the secondary electrode is made by spot welding portions of the corrugated electrode to the electrode faces which they contact. It will be observed that the secondary electrodes aer oriented so that the corrugations are horizontally disposed, i.e., in the same direction which fuel flows across the electrode plates. The vertically spaced channels provided by such horizontal corrugations tend to insure that flow is evenly distributed throughout the fuel corridor, and hence contacts the fuel electrode areas, properly. The effective surface area of the secondary electrodes 203 and 205, plus their respective primary electrodes, is substantially increased beyond the extent of effective surface area of the primary electrode alone.

When hydrogen gas, or a mixture thereof with nitrogen, carbon dioxide, carbon monoxide, water vapor and the like, is fed through line 167 of unit 101 and a supply of oxygen and carbon dioxide, or air and carbon dioxide is supplied to the air electrodes 133, 133', 143, and 143' and the secondary electrode 201, while the molten carbonate is maintained at over 500° C., a voltage will appear across the conducting enclosures 111 and 113 which effectively serve as terminal means as well as fuel supply means for the unit 101. The air enclosure will be the cathode and the fuel enclosure the anode. It will be apparent that the unit 101 could be adapted for operation, however, with oxidizer supplied to the inner "oxidizer" electrodes and fuel to the outer "fuel" electrodes.

It will also be apparent that the comments and advantages applicable to FIGURES 7 and 8 herein are likewise applicable to the unit 101 of FIGURES 9–11, since the embodiment of the secondary electrodes involved is substantially the same in each case.

Figure 12:
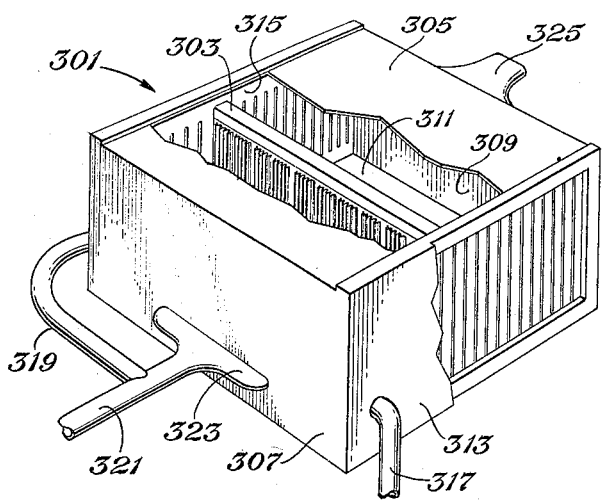
FIGURE 12 is a perspective view of a large fuel cell battery utilizing a plurality of fuel cell units similar to that illustrated in FIGURE 9, but each unit having more cells in series, and showing employment of the present invention in advantageous fashion in a large system.

Referring now to FIGURE 12, there is illustrated a large fuel cell battery 301. Essentially it consists of a multiplicity of units similar to unit 101 of FIGURES 9–11 assembled together. One such unit similar to unit 101 is unit 303, except that it may employ, for example, two parallel lines of ten cells in series instead of two parallel lines of two cells in series. The cell structure and the electrical connection of cells in unit 303 follow the same principle as in unit 101.

Fuel cell battery 301 has insulated top 305, insulated side 307, insulated side wall 309, and insulated bottom 311. It also has multi-slotted conducting fuel inlet enclosure 313 and multi-slotted conducting fuel outlet enclosure 315. The respective slots in each are aligned to transfer fuel through the corridors defined by the respective continuous cell walls provided within each unit.

A fuel inlet is provided by line 317 and a fuel outlet by line 319. Line 319 joins air inlet line 321 to provide carbon dioxide for the air electrodes. The air-carbon dioxide mixture enters through end 307 via inlet manifold 323, into a lower spacing provided between the bottom 311 and the cell units. Thereafter, it flows up between the units to enter a top spacing between the units and the top 305. The spent gases then pass out through exhaust manifold 325 in the upper central portion of opposite end 309. Note that like potential cells may have their electrolyte pores, i.e., electrolyte cavities, interconnected to a common electrolyte supply reservoir if desired. Thus, ten electrolyte reservoirs would be required to feed the parallel array of ten series connected cells involved in fuel cell battery 301.

Referring further to this large battery 301 in FIGURE 12, only one unit 303 is illustrated to make the illustration easier to follow. Examination of FIGURE 12 will reveal that units 303 will lie with their secondary air electrodes, similar to electrodes 201 of FIGURES 9–11, in facing relationship. With proper sizing, the secondary electrodes can be selected to contact. With some spot welding therebetween, considerable additional rigidity is obtained.

In those cases where screen wire is employed for secondary electrodes, a variety of screen sizes is usable. For many applications, 120 mesh wire gives satisfactory results.

One form of particularly suitable secondary electrode is made by sintering powdered metal material onto a screen wire, for example, by sintering fine particles of nickel onto a nickel screen wire of 100 mesh screen size.

It is to be understood that "porous," as used herein, includes the structures of screen wire as well as any material having pore structure or a multiplicity of fine pockets extending into, or through, the material in question. Moreover, "plate-like" includes substantially planar configurations of screen wire, along wtih substantially planar configurations of other materials.

It should be noted that the structure of the secondary electrodes disclosed herein has comparatively small effect on reactant flow rates between electrodes since there is but a small cross sectional area presented to resist flow.

The connection between a primary and secondary electrode should be made in such a way that the pore structure of each is placed in mass transfer relation in order that good electrolyte transfer can occur from the primary electrode to the secondary electrode. This is what is meant by the phrase "effective mass transfer relation," used in the claims hereof.

An example of a joint between a primary and secondary electrode having effective mass transfer relation is one obtained by spot welding. By this method, a good joint can be made while obstructing flow between adjoining pore structure only in those limited areas where each of the various spaced-apart spot welds are made.

The present invention is thus seen to provide an electrochemically active element, referred to herein as a "secondary electrode," for joining to primary electrodes to increase the effective electrochemically reactive area of the primary electrode. When a pair of electrodes of like polarity and potential are in facing, common reactant receiving relationship, the present invention is seen to be particularly effective.

The increased effective electrochemically reactive area provided by the present invention increases power density and decreases flooding. Moreover, structural support is provided by the same structure. Such structural support is particularly valuable when serving as interconnecting, supporting means for a pair of electrodes, but even a single electrode receives some reinforcement, e.g., a stiffening reinforcement occurs when a corrugated secondary electrode is attached to a primary electrode. It is thus seen that a triple effect is obtained from the structure of the invention.

Yet an additional beneficial effect results from the structure of the present invention: it provides flow directing and distributing means, in the form of channels, for the primary electrodes with which it is associated.

Having described the invention in connection with certain specific embodiments thereof, it is to be understood that further modifications may now suggest themselves to those skilled in the art and it is intended to cover such modifications as fall within the scope of the appended claims.

What is claimed is:

1. A fuel cell comprising at least two electrodes and an electrolyte, at least one of said electrodes comprising at least one primary electrode of an electrically conducting material, and a secondary electrode of an electrically conducting material and of the same polarity as said primary electrode, said secondary electrode consisting essentially of a plurality of first portions spaced from and physically and electrically connected with said primary electrode, and a second plurality of second portions contiguous with and physically and electrically connected with said primary electrode, each of said second plurality of said second portions being physically and electrically connected to at least one of said first portions, said plurality of said first and second sections of said secondary electrode defining gaseous reactant flow paths and simultaneously defining electrolyte diffusion paths effecting an electrolyte mass transfer relation with said primary electrode, thereby forming a large surface area where reactant, electrolyte and electrode are in intimate contact with each other.

2. The combination of the pair of electrodes and the secondary electrode of claim 1 in which the material of which said electrodes comprise screen wire with fine particles of metal sintered thereto.

3. An electrode in accordance with claim 1 wherein said at least one plate-like primary electrode and said at least one secondary electrode are made of screen wire with fine particles of metal sintered thereto.

4. The fuel cell of claim 1 wherein said electrically conducting material consists essentially of either silver, nickel, iron, stainless steel, silver-coated stainless steel, or nickel-impregnated stainless steel.

5. The fuel cell of claim 1 having two primary electrodes with said plurality of secondary electrodes intermediate and physically and electrically connected to said two primary electrodes.

6. The fuel cell of claim 1 in which said primary and secondary elecrodes are of screen material having a mesh size between 80 and 120.

7. The fuel cell of claim 1 wherein said secondary electrodes form plates extending essentially perpendicular to said at least one primary electrode.

8. The fuel cell of claim 1 wherein said secondary electrodes are configured in a "W" pattern extending outwardly from said at least one primary electrode.

9. The fuel cell of claim 1 wherein said secondary electrodes are configured in an "X" pattern.

10. The fuel cell of claim 1 wherein said secondary electrodes form a continuous corrugated sheet.

References Cited

UNITED STATES PATENTS

| | | | |
|---|---|---|---|
| 409,365 | 8/1889 | Mond et al. | 136—86 |
| 2,887,456 | 5/1959 | Halford et al. | 136—86 |
| 3,012,086 | 12/1961 | Vahldieck | 136—86 |
| 3,186,872 | 6/1965 | Ewing | 136—86 |
| 3,235,407 | 2/1966 | Nicholson et al. | 136—86 |

ALLEN B. CURTIS, Primary Examiner

HUGH A. FEELEY, Assistant Examiner

U.S. Cl. X.R.

136—120